United States Patent
de Filippis et al.

(10) Patent No.: US 12,463,557 B2
(45) Date of Patent: Nov. 4, 2025

(54) INVERTER SYSTEMS FEATURING HYBRID TCM/CCM MODULATION SCHEME

(71) Applicant: Infineon Technologies Austria AG, Villach (AT)

(72) Inventors: Stefano de Filippis, Villach (AT); Matthias Joachim Kasper, Villach (AT); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 123 days.

(21) Appl. No.: 18/481,743

(22) Filed: Oct. 5, 2023

(65) Prior Publication Data
US 2025/0119068 A1  Apr. 10, 2025

(51) Int. Cl.
*H02M 7/5387* (2007.01)
*H02M 1/00* (2007.01)
*H02M 7/5395* (2006.01)
*H02M 7/529* (2006.01)

(52) U.S. Cl.
CPC ..... *H02M 7/53873* (2013.01); *H02M 1/0043* (2021.05); *H02M 7/5395* (2013.01); *H02M 7/529* (2013.01)

(58) Field of Classification Search
CPC ........... H02M 1/0043; H02M 7/53873; H02M 7/5395
See application file for complete search history.

(56) References Cited

U.S. PATENT DOCUMENTS

| | | | |
|---|---|---|---|
| 8,564,995 B2 * | 10/2013 | Wu | H02M 7/5395 363/132 |
| 2012/0224403 A1 * | 9/2012 | Wu | H02M 7/5395 363/132 |
| 2024/0305218 A1 * | 9/2024 | Chen | H02M 1/123 |

OTHER PUBLICATIONS

Haider et al., "Novel ZVS S-TCM Modulation of Three-Phase AC/DC Converters", IEEE Open Journal of Power Electronics, vol. 1, Nov. 24, 2020, 13 pp.

* cited by examiner

*Primary Examiner* — Jue Zhang
(74) *Attorney, Agent, or Firm* — Shumaker & Sieffert, P.A.

(57) ABSTRACT

To reduce switching losses, an inverter circuitry of this disclosure may operate using triangular current mode (TCM) control for the semiconductor devices to achieve zero voltage switching (ZVS) at the turn-on of the semiconductor switches. In contrast to other techniques, such as operating the inverter circuitry in continuous conduction mode (CCM), switching devices experience hard switching (usually associated to body-diode hard commutation) at turn-on, and therefore experience the associated switching losses. The inverter circuitry of this disclosure is controlled by processing circuitry, which is configured to apply a smart frequency modulation scheme that enables TCM operation.

20 Claims, 10 Drawing Sheets

HERIC

INVERTER SYSTEMS FEATURING HYBRID TCM/CCM MODULATION SCHEME

TECHNICAL FIELD

The disclosure relates to electrical power inverter circuitry.

BACKGROUND

Non-isolated DC to AC converters, also known as inverters, may be implemented with one of several switching topologies and using any of several switches, e.g., bipolar junction transistors (BJT), metal oxide semiconductor field effect transistors (MOSFET) and power transistors such as insulated gate bipolar junction transistors (IGBT). Transistors may be implemented using silicon, gallium nitride (GaN), silicon carbide (SiC) and other materials. In some applications efficient operation may be desirable, such as converting DC power from photovoltaic cells to AC power. Therefore reducing losses in the inverters, e.g., conduction losses, switching losses and similar losses, may be beneficial.

SUMMARY

In general, the disclosure describes circuit operation to reduce semiconductor device switching losses associated with an inverter circuit. The inverter circuit topologies of this disclosure include H4 topology as well as other derived inverter topologies such as H5 and highly efficient and reliable inverter concept (HERIC) topology. To reduce switching losses, the inverter circuitry of this disclosure operates using triangular current mode (TCM) control for the semiconductor devices to achieve zero voltage switching (ZVS) at the turn-on of the semiconductor switches. In contrast to other techniques, such as operating inverter circuitry in continuous conduction mode (CCM), where switching devices experience hard switching (usually associated to body-diode hard commutation) at turn-on, and therefore experience the associated switching losses. The inverter circuitry of this disclosure is controlled by processing circuitry, which is configured to apply a smart frequency modulation scheme that enables TCM operation.

In one example, this disclosure describes an inverter circuit comprising input terminals, output terminals, and at least four semiconductor switches, the inverter circuit configured to: receive direct current (DC) input power at the input terminals and output alternating current (AC) power at the output terminals; and receive control signals from a controller, the controller comprising processing circuitry, wherein the control signals modulate a switching frequency for the inverter circuit based at least on an instantaneous AC output current and instantaneous AC output voltage at the output terminals, wherein the switching frequency is further based on a predetermined first AC output current, wherein the predetermined first AC output current is such that each switch turns ON with zero voltage switching (ZVS).

In another example, this disclosure describes a system comprising: processing circuitry configured to output switching control signals; and an inverter circuit comprising input terminals, output terminals, and at least four switches, the inverter circuit configured to: receive direct current (DC) input power at the input terminals and output alternating current (AC) power at the output terminals; and receive control signals from the processing circuitry, wherein the control signals modulate a switching frequency for the inverter circuit based at least on an instantaneous AC output current and instantaneous AC output voltage at the output terminals, wherein the switching frequency is further based on a predetermined first AC output current, wherein the predetermined first AC output current is such that each switch turns ON with zero voltage switching (ZVS).

In another example, this disclosure describes a method of controlling an inverter circuit comprising receiving, by processing circuitry, an indication of a magnitude of direct current (DC) input power received at input terminals of the inverter circuit; receiving, by the processing circuitry, an indication of an instantaneous magnitude of alternating current (AC) power at output terminals of the inverter circuit; delivering, by the processing circuitry, control signals to each switch of the inverter circuit, wherein the inverter circuit comprises at least four switches; modulating, by the processing circuitry, and via the control signals, a switching frequency of the inverter circuit, wherein the switching frequency is based at least on an instantaneous AC output current and instantaneous AC output voltage at the output terminals, and is such that each switch turns ON with zero voltage switching (ZVS).

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes an application of a hybrid triangular current mode (TCM) and continuous conduction mode (CCM) modulation scheme to inverters based on H4 topology and other derived inverter topologies such as H5, HERIC, or another topology. Operating using the hybrid TCM/CCM modulation scheme, the inverter circuit may achieve soft switching at the turn-on of the semiconductor switches, which may enable a dramatic reduction of the switching losses associated with the semiconductor switch devices.

In the implementation of the inverter circuits of this disclosure, the AC current output from the inverter circuit may experience a wide excursion from a small negative value of few amps, e.g. a "minimum" operating current ($I_1$) up to an instantaneous peak value ($I_2$). The control circuitry for inverter circuit of this disclosure may operate the inverter circuit with TCM by choosing a fixed value of $I_1$, the low current level, which ensures ZVS operation at the turn-on of the switches. In some examples, $I_1$ may be few "negative" amps. The control circuitry may control the switching such that the predefined values of the maximum current $I_2$ (namely the current values at which the device will turn-off) are determined based on the current demand from the load. Along the entire AC-cycle, the control circuitry may vary the switching frequency ($f_{SW}$) of the triangular pulse width modulated (PWM) carrier to enable TCM.

The control circuitry may operate the inverter circuit in open loop, e.g., without zero-crossing detection (ZCD) circuits for closed loop feedback. The control circuitry varies the switching frequency based for example on an instantaneous values of output power, AC voltage, DC voltage and the value of the output inductance.

In this manner the inverter circuit of this disclosure may operate with soft-switching when turning ON a switch. In contrast, an inverter circuit operating under only CCM mode may have a comparatively smaller difference between the lowest current and the peak current delivered to the load, and the inverter switches may operate with hard switching at turn ON. However, the inverter circuit of this disclosure may maintain soft switching through most of the AC cycle under most conditions, including delivering reactive power, e.g., when the power factor (PF) is less than one.

Figure 1A:
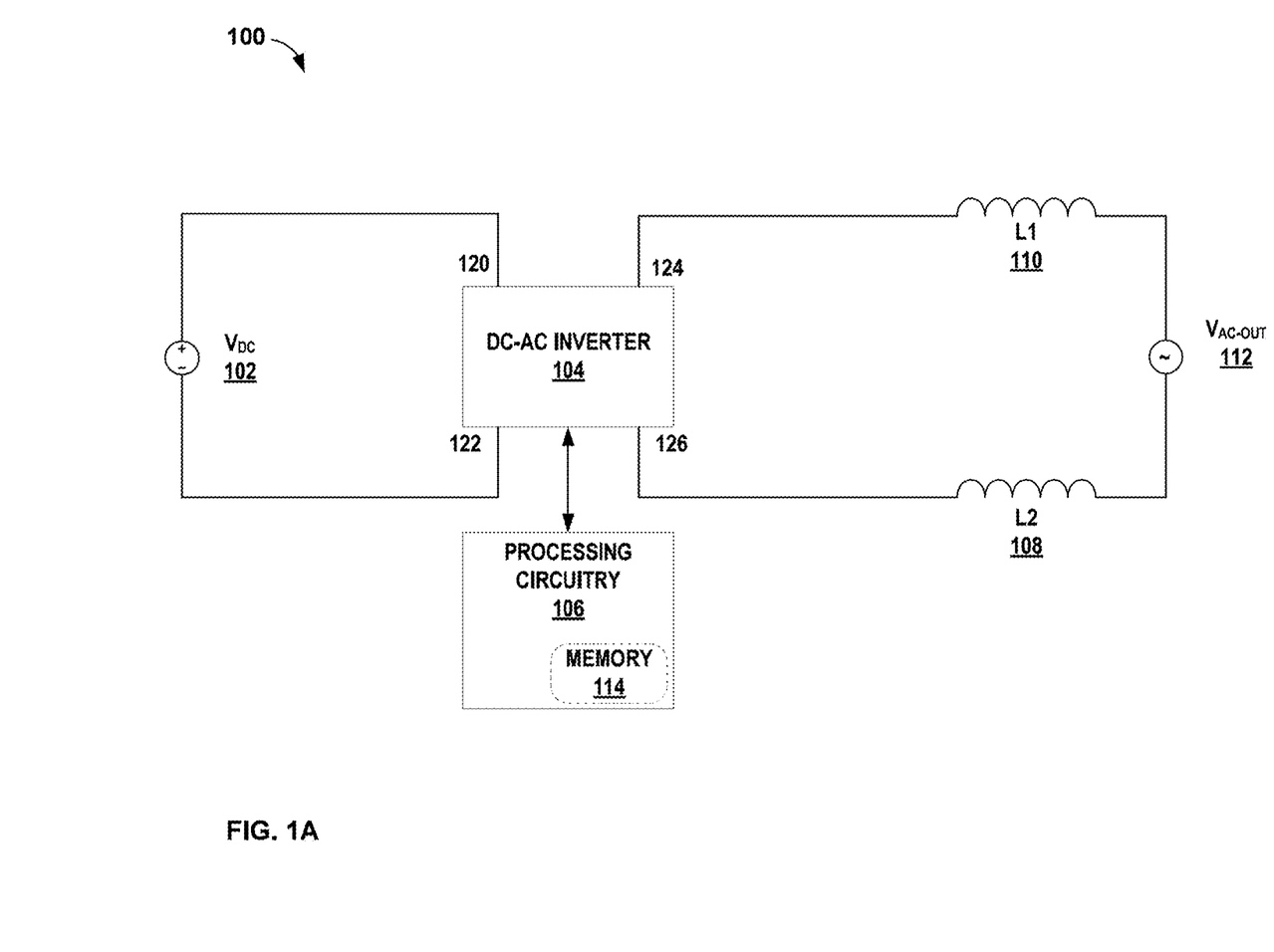
FIG. 1A is a block diagram illustrating an example inverter circuit of this disclosure.

FIG. 1A is a block diagram illustrating an example inverter circuit of this disclosure. In the example of FIG. 1A, system 100 is configured to convert DC input power, received from $V_{DC}$ 102 via input terminals 120 and 122 into AC output power at $V_{AC-OUT}$ 112. Applications for use of system 100 may include converting DC power from photovoltaic (PV) sources to be used on the power grid. The parasitic capacitance of PV panels may benefit from inverter topologies with zero common-mode and a full range of reactive power control for grid support, which system 100 may provide.

System 100 includes DC-AC inverter 104 and a controller including processing circuitry 106 operatively coupled to memory 114. DC-AC inverter 104 outputs $V_{AC-OUT}$ 112 through output terminals 124 and 126 connected, respectively to "high side" inductor L1, 110 and "low side" inductor L2 108.

DC-AC inverter 104 may be implemented as any of several different topologies. Some examples include an H4 topology, with two low-side switches and two high side switches. In other examples, DC-AC inverter 104 may be implemented as HERIC topology, which is a structure configured to avoid a fluctuating potential on the DC terminals of the PV generators by disconnecting the converter from the load, e.g., the utility grid connected at $V_{AC-OUT}$ 112. A HERIC topology may obtain a zero voltage level at the output by using a bidirectional switch during freewheeling periods.

As described above, processing circuitry 106 may control the operation of DC-AC inverter 104 using a PWM scheme that includes a hybrid of TCM and CCM. The TCM may result in soft-switching, e.g., when turning ON the switches of the inverter. Soft-switching may also result in reduced losses during operation and therefore an improvement in efficiency, when compared to other operating techniques. For TCM modulation, the inductor current reverses polarity before turn-on.

Other advantages of the circuit operation of this disclosure may include use of modulation strategies that enable the ZVS and/or TCM in an H4-based inverter system for all operating modes, including full reactive power, with open loop control. In other words, system 100 may operate without the additional hardware, e.g., zero-crossing detection (ZCD) circuitry, found in other examples of inverter systems. The soft switching throughout the operating cycle, also called the AC cycle in this disclosure, may deliver high efficiency in nearly all operating points. A more efficient inverter system may help to maximize the usage (and/or the storage) of energy generated by the photovoltaic (PV) cells, fostering the decarbonization strategical path in PV-system designs. In some examples, based on the phase angle between the current and the voltage, the circuit of this disclosure may operate in any of several operating modes, e.g., CCM or TCM, at different points in the operating cycle. In examples in which the power factor is one, e.g., the voltage and the current are in phase, at least one mode of operations results in ZVS switching of at least all four switches.

Due to the efficiency improvement the system may be further improved towards higher power-density by increasing the switching frequency and thus also the volume of system passives (such as filter components). The reduced volumes of passive components may result in size and cost savings and enable bill of material (BOM) reduction of associated passive components along with a higher switching frequency. Additional advantages may include eventually promoting the usage of wide bandgap (WBG) material-based semiconductor switches such as GaN and SiC transistors. WBG semiconductors may differ from conventional semiconductors since they have a larger bandgap. A bandgap refers to the energy difference in semiconductors between the top of the valence band and the bottom of the conduction band. The larger distance allows wide bandgap semiconductor power devices to operate at higher voltages, temperatures, and frequencies. In some examples, wide band gap semiconductor materials such as GaN and silicon carbide (SiC) may be a desirable material to use in order to improve efficiency of power converters relative to the efficiency of power converters that use silicon-based transistors.

Figure 1B:
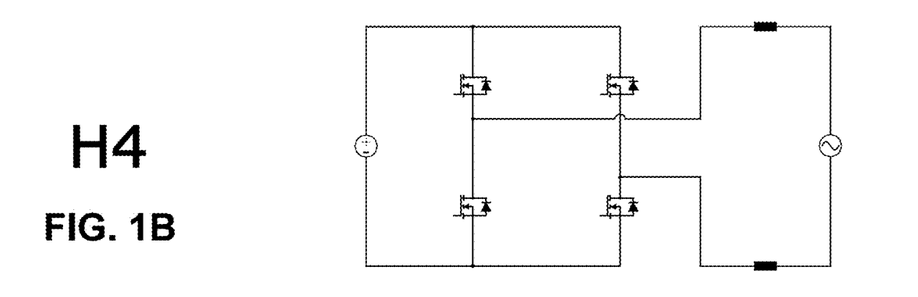
FIGS. 1B, 1C and 1D are schematic diagrams illustrating example implementations of a DC-AC converter circuit of this disclosure.
Figure 1C:
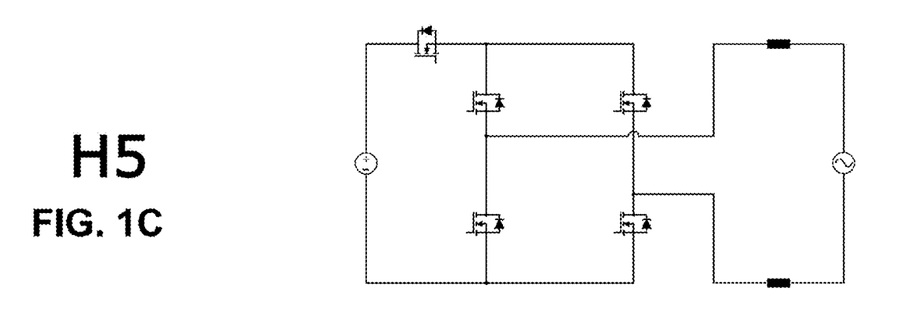
Figure 1D:
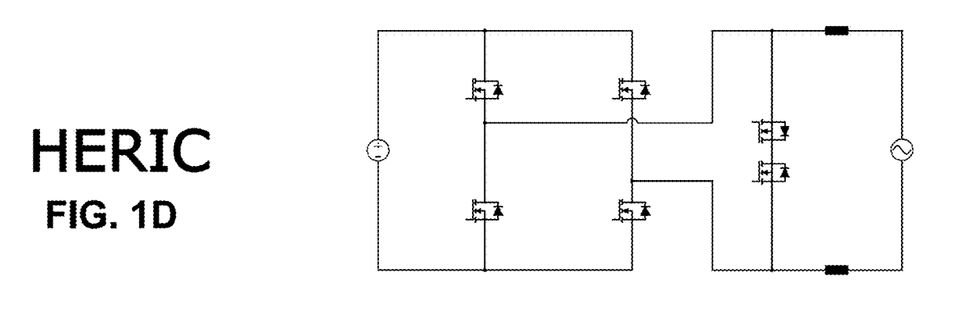

FIGS. 1B, 1C and 1D are schematic diagrams illustrating example implementations of a DC-AC converter circuit of this disclosure, e.g., DC-AC inverter 104 of FIG. 1A. FIG. 1B illustrates an H4 topology that includes four semiconductor switches arranged in a H-bridge. FIG. 1C illustrates an H5 topology, that includes the H-bridge as shown in FIG. 1B, as well as a fifth semiconductor switch located between the DC input supply and the high side switches. FIG. 1D illustrates an example of a HERIC topology. A HERIC topology includes the H-bridge, as shown in FIG. 1B with the switch node of the first half-bridge connected to the AC output through a first inductor and the switch node of the second half-bridge connected to the AC output through a second inductor. The switch nodes are connected through a bi-directional switch, or as shown in the example of FIG. 1D, through two switches connected to act as a bi-directional switch.

Figures 2A, 2B:
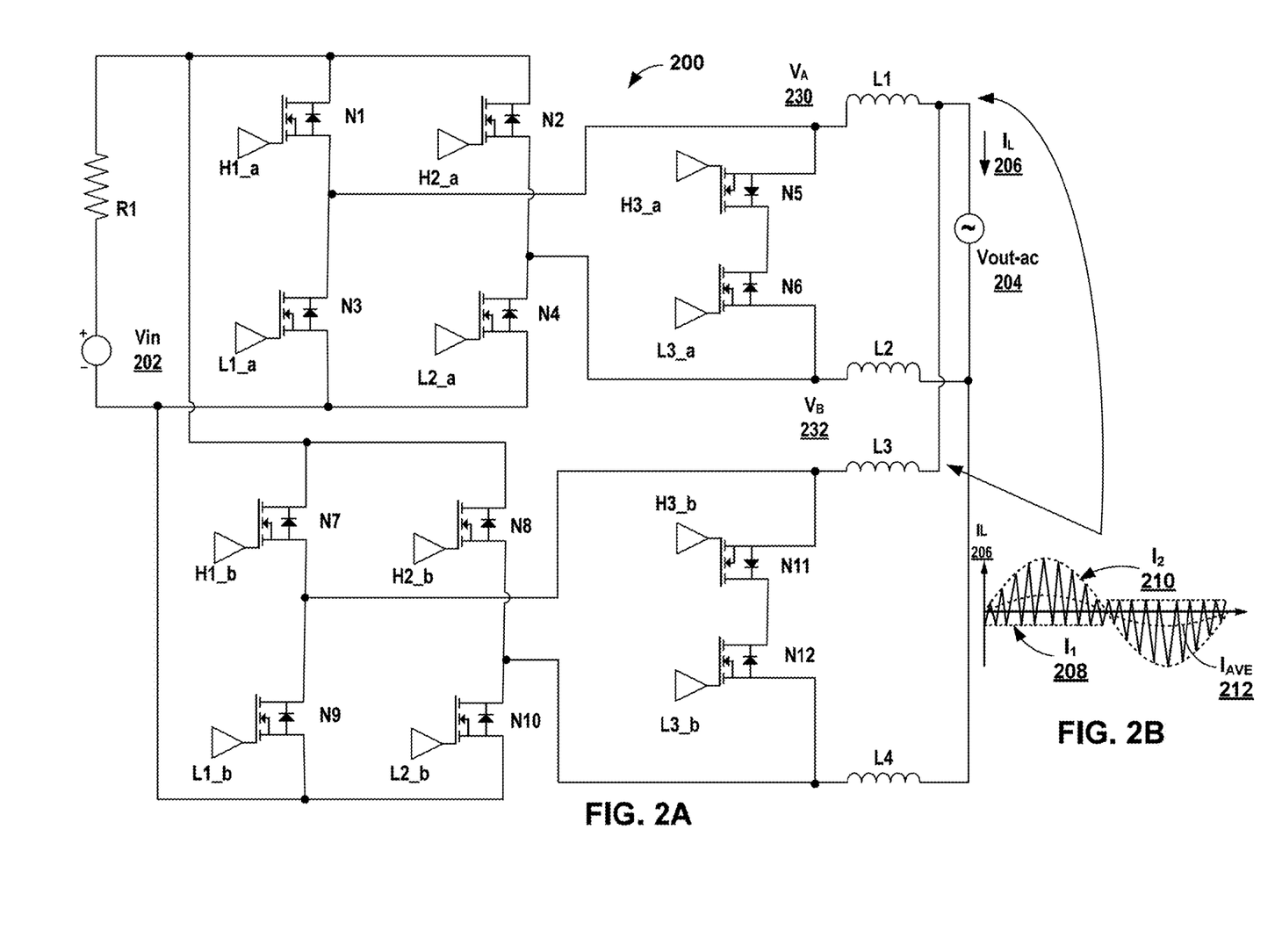
FIG. 2A is a schematic diagram illustrating an example inverter circuit of this disclosure implemented with HERIC architecture.
FIG. 2B is a time chart illustrating an example AC waveform with $I_1$ and $I_2$ and TCM.

FIGS. 2A and 2B are, respectively, a schematic diagram of a two phase interleaved HERIC topology inverter and a time graph showing an example output for the inverter. The inverter, circuit 200 of FIG. 2A, is an example of DC-AC inverter 104 described above in relation to FIG. 1A and may have the same or similar functions and characteristics. As described above, the techniques of this disclosure may also be beneficial to other topologies including H4, H5, single-phase HERIC topology and similar inverter topologies.

In the example of FIG. 2A, a controller, e.g., processing circuitry 106 of FIG. 1A, may control the operation of circuit 200 using the hybrid TCM/CCM PWM scheme described above in relation to FIG. 1A. Output signals from the controller may connect to the drivers for each switch of circuit 200, e.g., gate_H1_a, gate_H2_a, gate_L3_b, and the other drivers of circuit 200. The connections to each driver are not shown to simplify the figure.

The controller may modulate the switching frequency according to a preset maximum and minimum output current, $I_L$ 206 to achieve TCM and the desired soft-switching behavior. The maximum current, I2 210 and minimum current, I1 208, is shown in FIG. 2B. The specific value of minimum current I1, 208 and maximum current I2 210 depends on the selected circuit components, use application for circuit 200 and other similar factors. The minimum current, I1 208 may be a fixed value, as shown in FIG. 2B and selected to ensure ZVS when the switches turn ON. A small negative value for I1 208, e.g., a value less than zero, but close to zero, may be desirable to ensure ZVS for the switch turn ON. In some examples, a small negative value may include currents in the range of minus one to minus five Amps (−1 to −5 A). The predefined values for I2 210 vary throughout the operating cycle, shown in FIG. 2B, and may be determined based on the instantaneous value of the reference current. The curve for I2 210 may also be described as an envelope or boundary for the triangular shaped $I_L$ 206 shown in FIG. 2B. The variable frequency path generated by the controller (not shown in FIGS. 2A-2B) defines the frequency of the PWM carrier of FIG. 2B. The duty cycle for each switch in each phase of operation is controlled individually with an average current control, Iave 212, strategy, by means of a P-controller or PI-controller, executed by the processing circuitry.

In the example of FIG. 2A, inverter circuit 200 includes input terminals to receive input power from the positive and negative terminals of Vin 202. In some examples, resistor R1, connected in series between the positive terminal of Vin 202 and the input terminal of circuit 200, may be a modeled impedance for Vin 202. The input terminals for circuit 200 connect to the high side and low side of the two H-bridges formed by N-channel metal oxide semiconductor field effect transistors (MOSFET) N1, N2, N3 and N4, and "b" H-bridge formed by N7, N8, N9 and N10. The positive terminal for Vin 202 connects through resistor R1 to the drains of high side N1, N2, N7 and N8. The negative terminal for Vin 202 connects to the sources of low side transistors, N3, N4, N9 and N10.

The source of N1 connects to the drain of N3 as well as to inductor L1 and the source of N5. The source of N2 connects to the drain of N4 as well as to inductor L2 and the source of N6. Transistors N5 and N6 form a bi-directional switch configured to disconnect circuit 200 from the load, Vout-ac 204, during portions of the operating cycle. Similarly, the source of N7 connects to the drain of N9 as well as to inductor L3 and the source of N11. The source of N8 connects to the drain of N10 as well as to inductor L4 and the source of N12. Transistors N11 and N12 also form a bi-directional switch configured to disconnect circuit 200 from the output terminals that connect to Vout-ac 204, during portions of the AC cycle. In some examples, N5 and N6 may be replaced by a single bi-directional switch. Similarly, N11 and N12 may be replaced by a single bi-directional switch.

The TCM modulation of this disclosure enables soft-switching of the bi-directional switch not only for active power-mode but for reactive power mode as well, which may not be possible in CCM. When in "active" power mode, e.g., when $V_{AB}$ is greater than zero and $I_{OUT}$, e.g., IL 206, is also greater than zero, then the bi-directional switches may act as a synchronous rectifier (ZVS) for both CCM and TCM. In "reactive" power mode, e.g., when $V_{AB}$ is greater than zero and $I_{OUT}$, e.g., IL 206, is less than zero, then the bi-directional switches may experience hard switching in CCM, but ZVS for TCM. In the example of FIG. 2A, $V_{AB}$ is $V_A$ 230-$V_B$ 232.

In operation, and as described above in relation to FIG. 1A, circuit 200 is configured to receive DC input power, Vin 202, at the input terminals and output AC power at the output terminals connected to the load, e.g., a utility grid at Vout-ac 204. Circuit 200 may receive control signals from a controller (not shown in FIG. 2A). The control signals modulate a switching frequency for inverter circuit 200 based at least on an instantaneous AC output current, $I_L$ 206, and instantaneous AC output voltage, Vout-ac 204 at the output terminals. This second AC output current, I2 210 is an electric current value at which each switch turns OFF with ZVS and through most of the positive AC half-cycle, the magnitude of I2 210 is greater than I1 208, and through most of the negative AC half-cycle, the magnitude of I2 210 is smaller than I1 208, as shown in FIG. 2B. As noted above, the switching frequency is also based on I1 208, as well as the instantaneous output current I2 210. The switching frequency in the example of FIG. 2 may vary throughout the AC switching cycle for the inverter circuit.

The control signals are input to the driver circuitry, e.g.: driver H1_a, connected to the gate of N1, driver H2_a connected to the gate of N2, driver L1_a, connected to the gate of N3, driver L2_a connected to the gate of N4, driver H1_b, connected to the gate of N7, driver H2_b connected to the gate of N8, driver L1_b, connected to the gate of N9, and driver L2_b connected to the gate of N10. For the bidirectional switch arrangements, driver H3_a connects to the gate of N5, driver L3_a connects to the gate of N6, driver H3_b connects to the gate of N11, and driver L3_b connects to the gate of N12.

Figure 3:
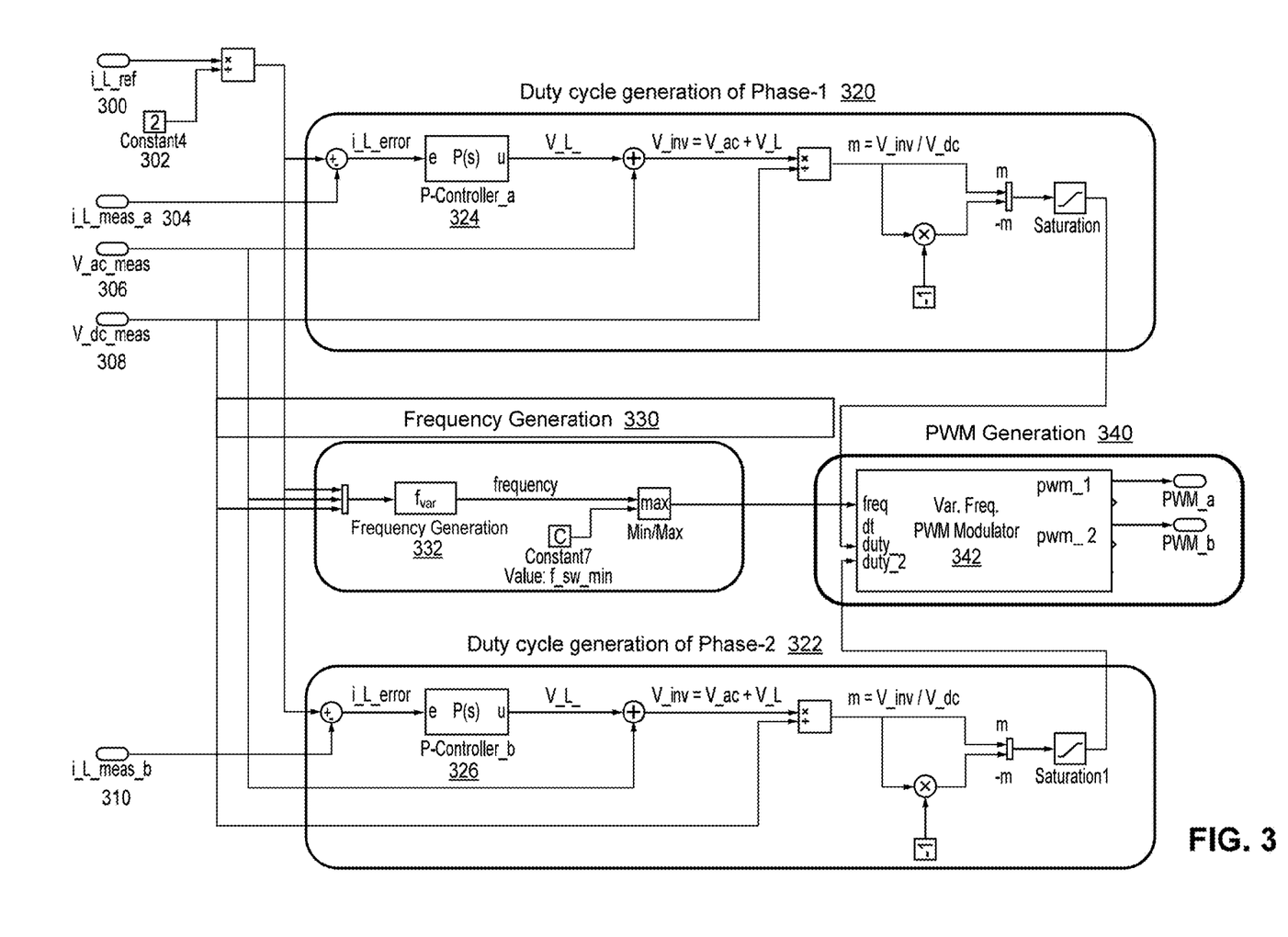
FIG. 3 is a schematic diagram illustrating an example implementation of the control circuitry of this disclosure.

FIG. 3 is a schematic diagram illustrating an example implementation of the control loop configured to enable the TCM/CCM hybrid modulation scheme according to one or more techniques of this disclosure. The control loop in the example of FIG. 3 may be executed by processing circuitry of a controller for the inverter circuit as described above in relation to FIGS. 1, 2A and 2B, e.g., processing circuitry 106 of FIG. 1A. The control in the example of FIG. 3 may be configured to control a HERIC topology similar to that described above in relation to FIG. 2A. Thus, the "a" and "b" portions of FIG. 3 may correspond to the "a" (phase 1) and "b" (phase 2) portions of the circuit of FIG. 2A.

The control loop may receive input signals from the inverter circuit and output the PWM signals to each driver circuit from PWM generation 340. In the example of FIG. 3, the input signals include reference current i_L_ref 300, which may be divided by a constant 302 which corresponds to the number of phases in the system, i_L_meas_a 304, V_ac_meas 306, V_dc_meas 308 and i_L_meas_b 310.

Based on the received input measurements, the circuitry for phase 1 duty cycle generation 320 and phase 2 duty cycle generation 322 may output the calculated duty cycle for the associated time period of the AC cycle to PWM generation 340. Individual duty-cycle modulation for every phase follows the PWM scheme based on generation of an error current that feeds a P-controller or a PI-controller, e.g., P-controller_a 324 and P-controller_b 326.

PMW generation 340 further receives a frequency signal from frequency generation 330 used to calculate and generate the PWM signals to control the switches for the inverter circuit. Frequency generation block 332 of frequency generation 330 is configured to compute the instantaneous I2 value, as shown in FIG. 2B above, and defines the equivalent frequency accordingly. In the example of FIG. 3, variable frequency PWM modulator block 342 includes a voltage controlled oscillator (VCO), not shown in FIG. 3, fed by the received variable frequency. Variable frequency PWM modulator block 342 may also include comparators for the generation of the PWM signals. In the example of FIG. 3 with the two phases, e.g., "a" and "b," also described above in relation to FIG. 2A, variable frequency PWM modulator block 342 may include a comparator for each phase.

Figure 4A:
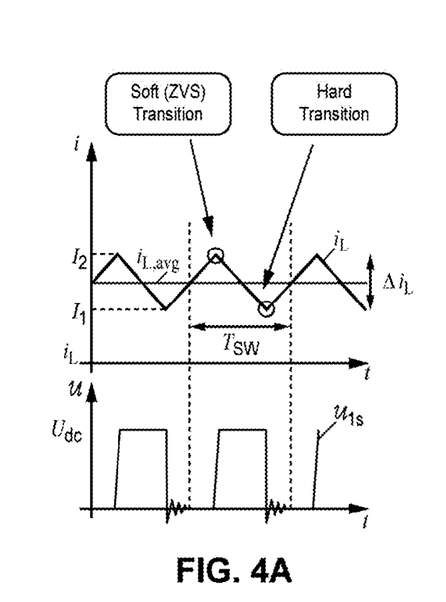
FIGS. 4A and 4B are time graphs comparing operation of an inverter circuit using CCM and TCM.
Figure 4B:
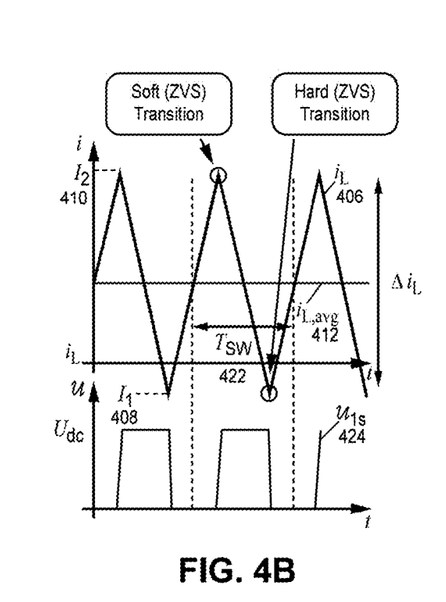

FIGS. 4A and 4B are time graphs illustrating an example comparison of CCM operation to TCM operation, according to one or more techniques of this disclosure. FIG. 4A is a time graph illustrating CCM operation for a HERIC inverter circuit, such as circuit 200 described above in relation to FIG. 2A. In regular CCM operation the switches of the HERIC will experience hard-switching at the turn-on FIG. 4B is a time graph illustrating TCM operation. For TCM operation, the switches of the inverter will experience soft-switching, and the reduction in losses resulting in efficiency improvement. In the example of FIG. 4B, $I_L$ 406 corresponds to $I_L$ 206, described above in relation to FIG. 2B. Similarly, I1 408, I2 410 and $i_{L\text{-}avg}$ 412 correspond to I1 208, I2 210 and $i_{avg}$ 212 of FIG. 2B. Also shown in FIG. 4B is the switching period $T_{SW}$ 422, the change in $i_L$, $\Delta i_L$ 420, and the voltage across the power switch terminals $u_{1s}$ 424.

As described above in relation to FIGS. 1-2B, for the inverter circuit of this disclosure, the controller implements TCM by choosing a fixed small negative value for I1 408 (which ensures ZVS at the turn-on of the switches), while the predefined values of I2 410 are determined based on the instantaneous value of the reference current, e.g., i_L_ref 300 described above in relation to FIG. 3. Knowing I1 and I2 the controller may determine on-time and off-time of the switches, as well as an equivalent switching period, $T_{SW}$ 422, and the corresponding frequency for the switching period, according to the below equations:

$$T_{on} = L \cdot \frac{|I_2 - I_1|}{V_{IN} - |V_{AC}|}$$

$$T_{off} = L \cdot \frac{|I_2 - I_1|}{V_{IN} + |V_{AC}|} \quad \text{(for } H4 \text{ topologies)}$$

$$T_{off} = L \cdot \frac{|I_2 - I_1|}{|V_{AC}|} \quad \text{(for } HERIC \text{ and } H5 \text{ topologies)}$$

$$f_{sw} = \frac{1}{T_{on} + T_{off}}$$

where L is the value of the output inductor, e.g., the sum of L1 and L2 described above in relation to FIG. 1.

As described above, Along the entire AC-cycle, the switching frequency, $f_{SW}$ of the triangular PWM carrier varies in order to enable TCM. The operation of the inverter circuit operates with an open-loop implementation. In other words, $f_{SW}$ varies without requiring any additional ZCD (Zero Crossing Detection) hardware usually needed to detect the crossing of the instantaneous inductor current through the zero-level. That is the inverter circuit of this disclosure does not use ZCD circuits to maintain ZVS (soft-switching).

Figure 5:
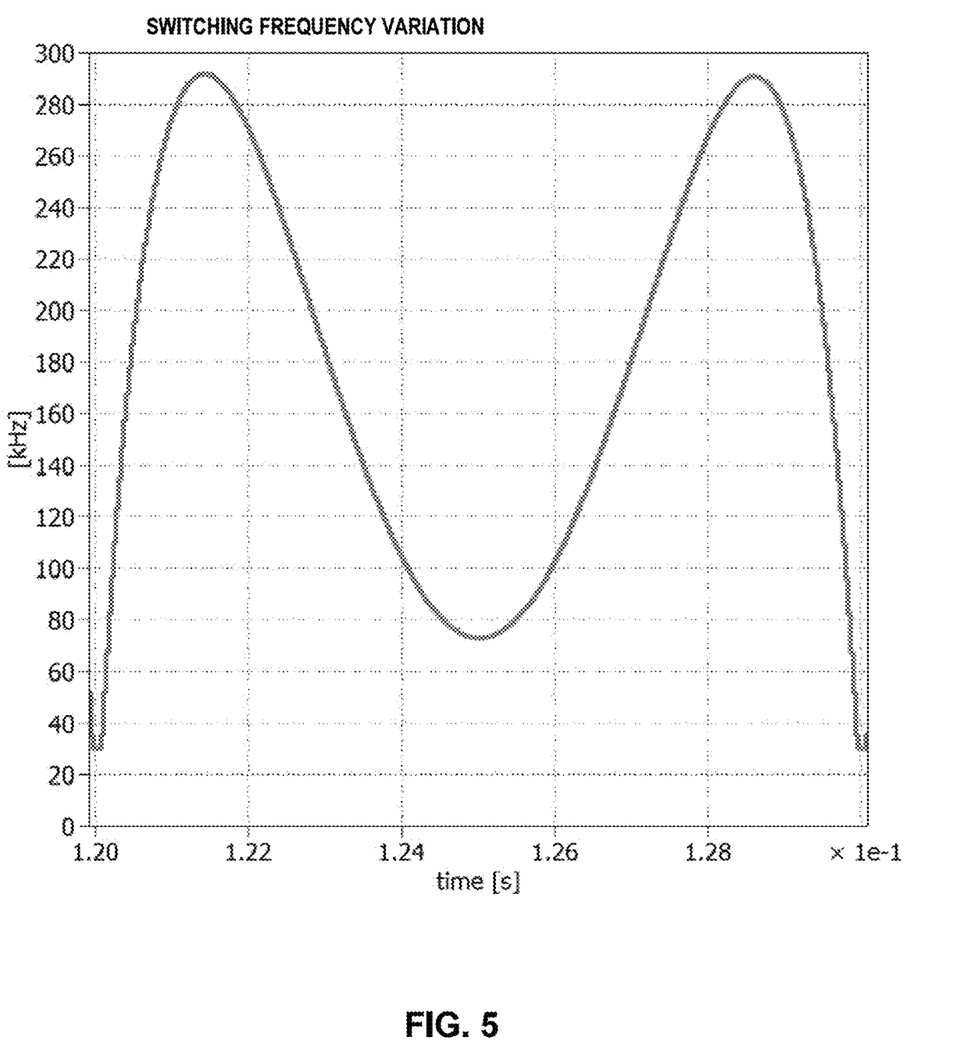
FIG. 5 is a time graph illustrating an example of switching frequency, $f_{SW}$, variation along the positive AC semi-cycle.

FIG. 5 is a time graph illustrating an example of switching frequency variation, $f_{SW}$, along the positive AC semi-cycle. The controller for the inverter circuitry, e.g., processing circuitry 106 of FIG. 1A, may determine the variation in the switching frequency over the AC cycle based on the equations described above in relation to FIG. 4B. The controller may generate the switching frequency, depicted in FIG. 5, using the example controller implementation of FIG. 3.

Figure 6A:
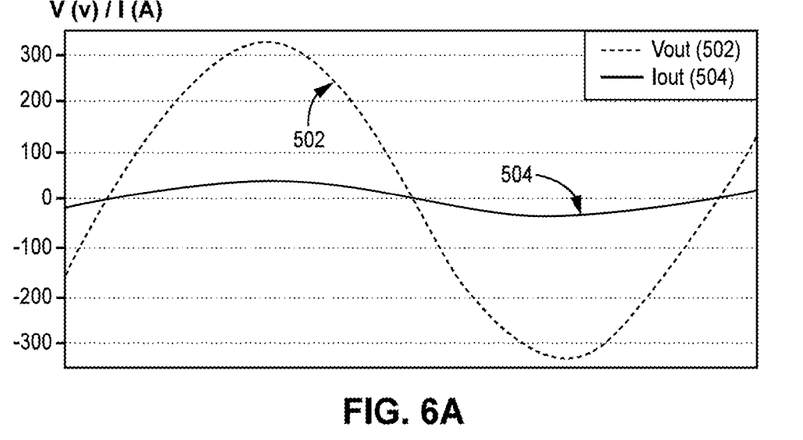
FIGS. 6A and 6B are time graphs illustrating an example operation of a HERIC topology inverter using hybrid CCM/TCM modulation.
Figure 6B:
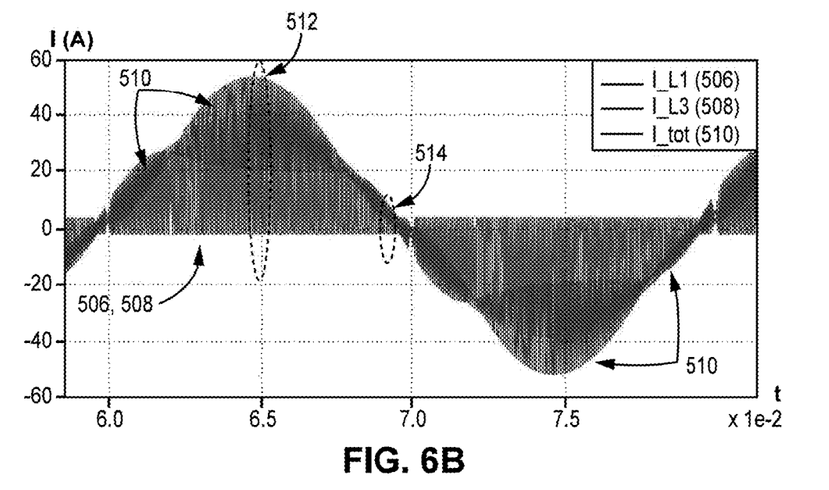

FIGS. 6A and 6B are time graphs illustrating an example operation of a HERIC topology inverter using hybrid CCM/TCM modulation. The example of FIGS. 6A and 6B are based on the two interleaved phases described above in relation to FIGS. 2A and 3, with control of the average current, e.g., $I_{AVE}$ 212 of FIG. 2B, for each phase, power factor (PF) control in the range from zero to one, and with an output power of six kilowatts (kW). The example of FIGS. 6A and 6B use example values and settings to illustrate the operation of the control techniques of this disclosure. Other values and settings may also be used, such as an output power (Pout) different from six kW.

The inductor currents, I_L1 506, I_L3 508, and I_tot 510 correspond, respectively to the current through L1, L3 and to $I_L$ 206, respectively described above in relation to FIG. 2A. Output current Iout 504, also corresponds to $I_L$ 206. Vout 504 corresponds to Vout-ac 204 of FIG. 2 as well as to the output voltage of FIG. 1A. Inductor current I_L1 506 and I_L3 508 partially overlap in FIG. 6B as they have 180° phase shift. The total current, I_tot 510 is shown in the region indicated by 510 of FIG. 6B. In the region indicated by 512, the controller for the inverter causes the switching frequency to be set to approximately 70 kHz. In the region indicated by 514 in the positive semi-cycle of FIG. 6B, the switching frequency is approximately 290 kHz, which corresponds to the changes in $f_{SW}$ depicted in FIG. 5.

Figure 7A:
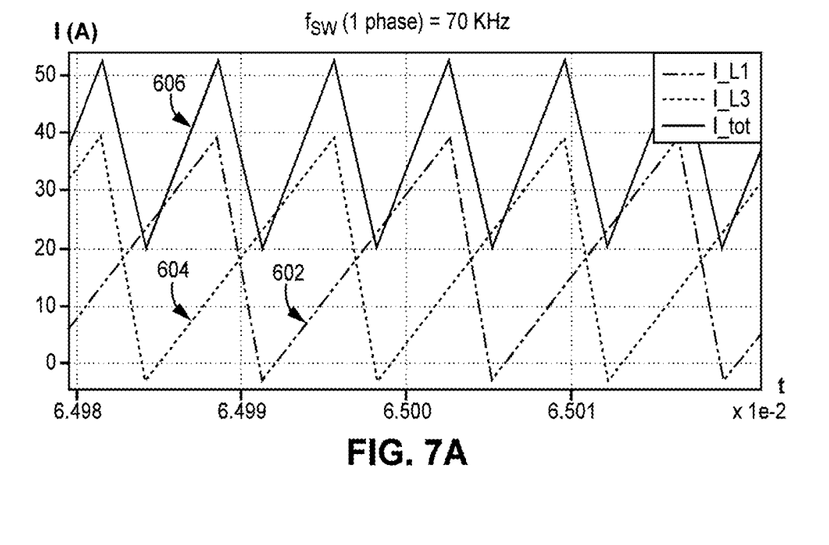
FIGS. 7A and 7B are time graphs illustrating example zoomed in areas for the time graph shown in FIG. 6B.
Figure 7B:
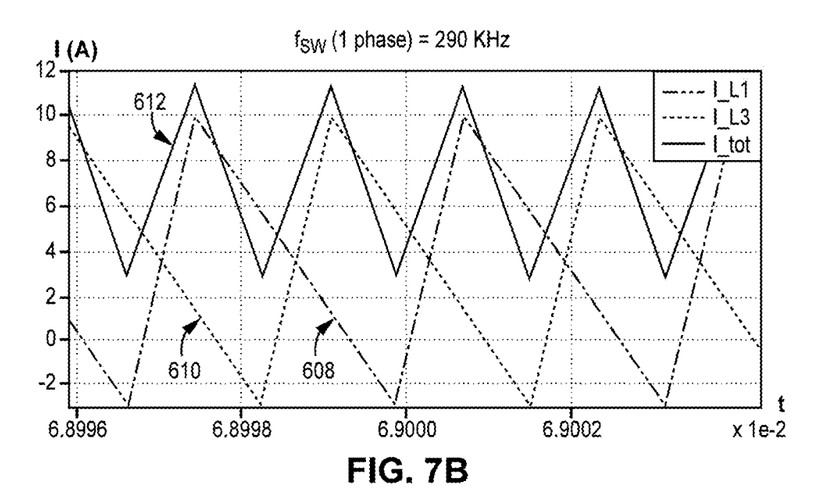

FIGS. 7A and 7B are time graphs illustrating example zoomed in areas for the time graph shown in FIG. 6B. The example of FIG. 7A represents the 70 kHz switching frequency region indicated by 512 of FIG. 6B. The inductor currents, I_L1 602, I_L3 604, and I_tot 606 correspond to I_L1 506, I_L3 508, and I_tot 510 of FIG. 6B, respectively.

The example of FIG. 7B represents the 290 kHz switching frequency region indicated by 514 of FIG. 6B. Similarly, I_L1 608, I_L3 610, and I_tot 612 correspond to I_L1 506, I_L3 508, and I_tot 510 of FIG. 6B, respectively.

Figure 8A:
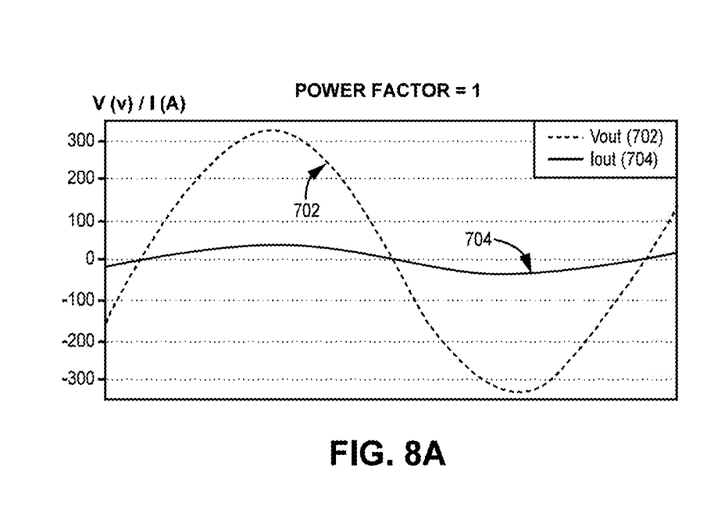
FIGS. 8A and 8B are time graphs illustrating an example operation of a HERIC topology inverter using hybrid CCM/TCM modulation for a power factor of one.
Figure 8B:
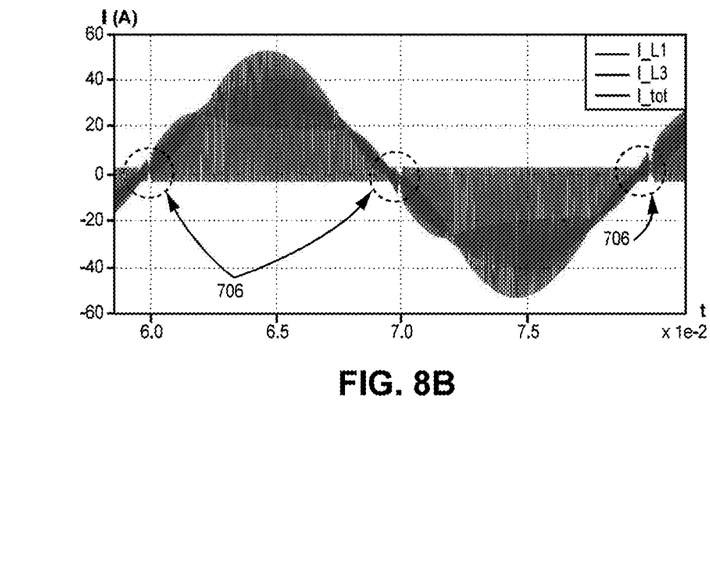

FIGS. 8A and 8B are time graphs illustrating an example operation of a HERIC topology inverter using hybrid CCM/TCM modulation for a power factor of one. The use of the hybrid TCM/CCM modulation scheme for this disclosure, ensures ZVS conditions can be achieved through almost the whole AC-cycle enabling higher efficiency and power density. In the examples of FIGS. 8B and 8D, the regions indicated by 706 are regions in which the controller for the inverter may operate in CCM mode and may include some hard switching during switch turn ON.

In other words, the controller may cause the inverter to operate in one of several modes during the AC cycle, depending on the phase angle between the current and the voltage. In a first mode, the power factor may be 1 or close to 1. A power factor of 1 indicates that the voltage and current are in phase and have a low-harmonic content. A power factor of zero indicates that the voltage and current are 90-degrees out of phase. In some examples, during reactive power delivery (when voltage and current are not in phase) the switches may lose ZVS condition for a small portion of the AC cycle as shown in FIGS. 8B and 8D. In examples in which the voltage and current are in phase throughout the AC cycle, the inverter circuit may operate with ZVS at every operation point of the AC cycle. In other examples, as shown in FIGS. 8B and 8D, the inverter circuit may operate in a mode in which there is at least some hard switching (706). Therefore, in at least one mode of these several different modes of operations the inverter circuit operates with ZVS switching of at least all four switches.

As with FIG. 6B above, the inductor currents, I_L1, I_L3, and I_tot correspond to I_L1 506, I_L3 508, and I_tot 510 of FIG. 6B. Output current Iout 704, also corresponds to $I_L$ 206 and Vout 702 corresponds to Vout-ac 204 of FIG. 2 as well as to the output voltage of FIG. 1A, $V_{AC\text{-}OUT}$ 112.

Figure 8C:
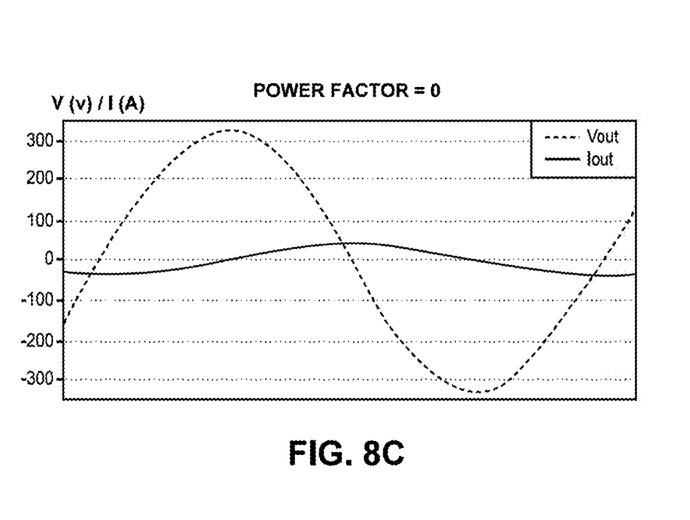
FIGS. 8C and 8D are time graphs illustrating an example operation of a HERIC topology inverter using hybrid CCM/TCM modulation for a power factor of zero.
Figure 8D:
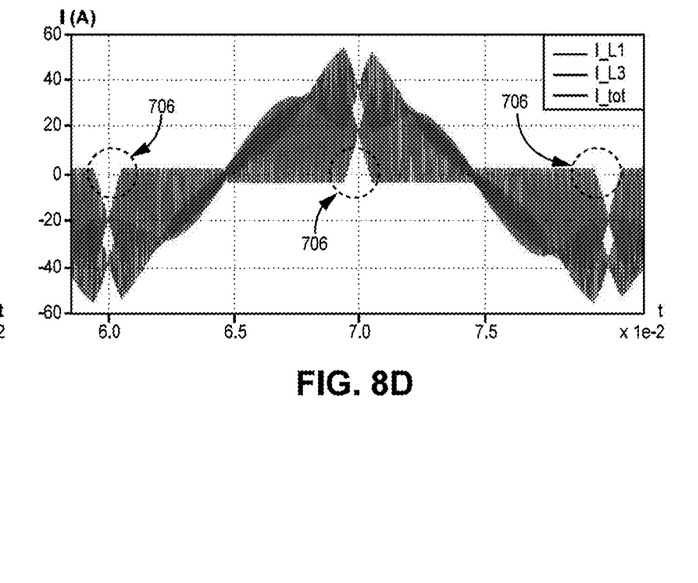

FIGS. 8C and 8D are time graphs illustrating an example operation of a HERIC topology inverter using the hybrid CCM/TCM modulation for a power factor of zero. The power converter of this disclosure is configured to operate for any PF (from 0 to 1), thereby allowing control of the apparent power even when the power to control is totally reactive.

Figure 9:
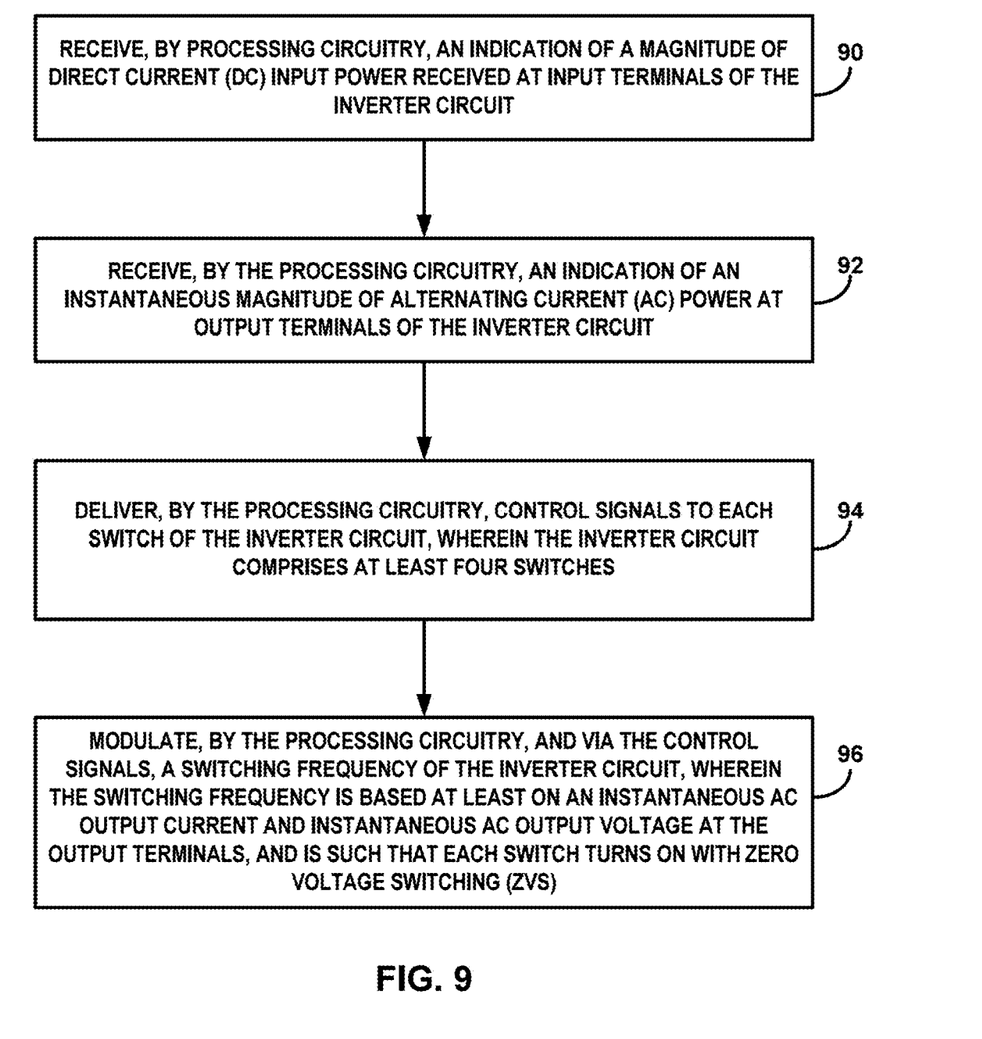
FIG. 9 is a flow chart illustrating an example operation of a HERIC topology inverter using hybrid CCM/TCM modulation of this disclosure.

FIG. 9 is a flow chart illustrating an example operation of a HERIC topology inverter using the hybrid CCM/TCM modulation of this disclosure. The steps illustrated by the blocks of FIG. 9 will be described in terms of FIGS. 1 and 2, unless otherwise noted.

Processing circuitry 106 for DC-AC inverter circuit 104 of system 100 may receive an indication of a magnitude of DC input power, $V_{DC}$ 102, received at input terminals 120 and 122 of DC-AC inverter circuit 104 (90). In some examples, processing circuitry 106 may sense $V_{DC}$ 102 using an analog-digital converter connected to a voltage divider (not shown in FIG. 1A), or any other technique to determine $V_{DC}$ 102.

In some examples, processing circuitry 106 may also receive an indication of an instantaneous magnitude of AC power, $V_{AC\text{-}OUT}$ 112, at output terminals 124 and 126 of inverter circuit 104 (92). In other examples, processing circuitry may also include connections directly to $V_{AC\text{-}OUT}$ 112, to sense the output current and voltage, rather than through inductors L1 110 and L2 108.

Processing circuitry 106 may also deliver control signals (not shown in FIG. 1 or 2) to each switch of inverter circuit 104, e.g., via the drivers for each switch as described above in relation to FIG. 2 (94). In some examples, DC-AC inverter circuit 104 may comprise at least four switches, e.g., an H4 topology, shown in FIG. 1B, as well as the HERIC topology shown in FIGS. 1D and 2 or an H5 topology shown in FIG. 1C.

Processing circuitry 106 may modulate via the control signals, a switching frequency of the inverter circuit as described above in relation to FIG. 5 (96). Processing circuitry 106 may determine the switching frequency based on the instantaneous AC output current, e.g., $I_L$ 206, $I_L$ 406, and Itot 510 described above respectively in relation to FIGS. 2, 4A and 6A. As described above in relation to FIG. 4B, processing circuitry 106 may determine an absolute value of a difference $\Delta I_L$ 420, between a peak value, I2 410 of output current $I_L$ 406 and the predetermined minimum value of $I_L$ 406, I1 408. Processing circuitry 106 may further determine the switching frequency, $f_{SW}$, based on the instantaneous AC output voltage at the output terminals, and the time in the AC cycle to turn ON a switch, $T_{ON}$, and the time in the AC cycle to turn OFF a switch, $T_{OFF}$, according to the equations described above in relation of FIG. 4B. Processing circuitry 106 may thereby modulate the switching frequency such that each switch turns ON with zero voltage switching, e.g., soft switching.

In one or more examples, the functions described above may be implemented in hardware, software, firmware, or any combination thereof. For example, the various components of FIG. 1A may be implemented in hardware, software, firmware, or any combination thereof. If implemented in software, the functions may be stored on a tangible computer-readable storage medium, e.g., memory 114 of FIG. 1A and executed by a processor or hardware-based processing unit, e.g., processing circuitry 106.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described.

The techniques of this disclosure may also be described in the following clauses.

Clause 1: An inverter circuit comprising receive direct current (DC) input power at the input terminals and output alternating current (AC) power at the output terminals; and receive control signals from a controller, the controller comprising processing circuitry, wherein the control signals modulate a switching frequency for the inverter circuit based at least on an instantaneous AC output current and instantaneous AC output voltage at the output terminals, wherein the switching frequency is further based on a predetermined first AC output current, wherein for at least one operating mode, the predetermined first AC output current is such that each switch is configured to turn ON with zero voltage switching (ZVS).

Clause 2: The circuit of clause 1, wherein the switching frequency varies throughout an AC switching cycle for the inverter circuit; wherein the switching frequency is further based on a second AC output current during an AC switching cycle, wherein the second AC output current is an electric current value at which each switch turns OFF, and wherein the second AC output current has a greater magnitude than the first AC output current.

Clause 3: The circuit of any of clauses 1 and 2, wherein the output terminals comprise a first output terminal and a second output terminal, and wherein the controller is configured to determine a time to turn ON a first switch of the at least four switches ($T_{on}$), wherein the controller is configured to determine $T_{on}$ according to:

$$T_{on} = L\frac{|I_2 - I_1|}{V_{IN} - |V_{AC}|}$$

wherein: L represents the sum of the inductance of a first inductor connected to the first output terminal of the output terminals and of a second inductor connected to the second output terminal of the output terminals, $I_1$ represents an instantaneous magnitude of the first AC output current, $I_2$ represents an instantaneous magnitude of the second AC output current, $V_{IN}$ represents a voltage magnitude of the DC input power, and $V_AC$ represents an instantaneous voltage magnitude of the DC output power.

Clause 4: The circuit of clause 3, wherein the inverter circuit comprises switches arranged in a highly efficient and reliable inverter concept (HERIC) topology, wherein the controller is configured to determine a time ($T_{off}$) to turn OFF a first switch of the at least four switches, wherein the controller is configured to determine $T_{off}$ according to:

$$T_{off} = L\frac{|I_2 - I_1|}{|V_{AC}|}$$

Clause 5: The circuit of clause 4, wherein an instantaneous switching frequency ($f_{SW}$) is defined according to:

$$f_{SW} = \frac{1}{T_{on} + T_{off}}$$

Clause 6: The circuit of any of clauses 1 through 5, wherein during an AC-cycle of the output AC power, the controller is configured to modulate the switching frequency to enable the conduction of an electrical current excursion of the output AC power between the first AC output current and a second AC output current.

Clause 7: The circuit of clause 6, wherein the controller is configured to apply a triangular carrier signal to modulate the changes in the switching frequency.

Clause 8: The circuit of any of clauses 1 through 7, wherein the controller is configured to modulate the switching frequency without regard to zero crossing detection (ZCD) measurements.

Clause 9: A system comprising processing circuitry configured to output switching control signals; and an inverter circuit comprising input terminals, output terminals, and at least four switches, the inverter circuit configured to: receive direct current (DC) input power at the input terminals and output alternating current (AC) power at the output terminals; and receive control signals from the processing circuitry, wherein the control signals modulate a switching frequency for the inverter circuit based at least on an instantaneous AC output current and instantaneous AC output voltage at the output terminals, wherein the switching frequency is further based on a predetermined first AC output current, wherein for at least one operating mode, the predetermined first AC output current is such that each switch is configured to turn ON with zero voltage switching (ZVS).

Clause 10: The system of clause 9, wherein the switching frequency varies throughout an AC switching cycle for the inverter circuit; wherein the switching frequency is further based on a second AC output current during an AC switching cycle, wherein the second AC output current is an electric current value at which each switch turns OFF, and wherein the second AC output current has a greater magnitude than the first AC output current.

Clause 11: The system of any of clauses 9 and 10, wherein the processing circuitry is configured to determine a time to turn ON a first switch of the at least four switches ($T_{on}$), wherein the controller is configured to determine $T_{on}$ according to:

$$T_{on} = L\frac{I_2 - I_1}{V_{IN} - |V_{AC}|}$$

wherein: L is the sum of an inductance of a first inductor connected to a first output terminal of the output terminals and of a second inductor connected to a second output terminal of the output terminals, $I_1$ is an instantaneous magnitude of the first AC output current, $I_1$ is an instantaneous magnitude of the second AC output current, $V_{IN}$ is a voltage magnitude of the DC input power, and $V_{AC}$ is an instantaneous voltage magnitude of the DC output power.

Clause 12: The system of any of clauses 9 through 11, wherein the inverter circuit comprises switches arranged in a highly efficient and reliable inverter concept (HERIC) topology, wherein the processing circuitry is configured to determine a time to turn OFF a first switch of the at least four switches ($T_{off}$), wherein the controller is configured to determine $T_{off}$ according to:

$$T_{off} = L\frac{I_2 - I_1}{|V_{AC}|}$$

Clause 13: The system of clause 12, wherein an instantaneous switching frequency is determined by:

$$f_{SW} = \frac{1}{T_{on} + T_{off}}$$

Clause 14: The system of any of clauses 9 through 13, wherein during an AC-cycle of the output AC power, the processing circuitry is configured to modulate the switching frequency to enable the conduction of an electrical current excursion of the output AC power between the first AC output current and a second AC output current.

Clause 15: The system of clause 14, wherein the processing circuitry is configured to apply a triangular carrier signal to modulate the changes in the switching frequency.

Clause 16: The system of any of clauses 9 through 15, wherein the processing circuitry is configured to modulate the switching frequency without regard to zero crossing detection (ZCD) measurements.

Clause 17: A method of controlling an inverter circuit comprising receiving, by processing circuitry, an indication of a magnitude of direct current (DC) input power received at input terminals of the inverter circuit; receiving, by the processing circuitry, an indication of an instantaneous magnitude of alternating current (AC) power at output terminals of the inverter circuit; delivering, by the processing circuitry, control signals to each switch of the inverter circuit, wherein the inverter circuit comprises at least four switches; modulating, by the processing circuitry, and via the control signals, a switching frequency of the inverter circuit, wherein the switching frequency is based at least on an instantaneous AC output current and instantaneous AC output voltage at the output terminals, and is such that, for at least one operating mode, each switch is configured to turn ON with zero voltage switching (ZVS).

Clause 18: The method of clause 17, further comprising determining a time to turn ON a first switch of the at least four switches ($T_{on}$), wherein the controller is configured to determine $T_{on}$ according to:

$$T_{on} = L\frac{I_2 - I_1}{V_N - |V_{AC}|}$$

wherein: L is the sum of the inductance of a first inductor connected to a first output terminal of the output terminals and of a second inductor connected to a second output terminal of the output terminals, $I_1$ is an instantaneous magnitude of the first AC output current, $I_2$ is an instantaneous magnitude of the second AC output current, $V_{IN}$ is a voltage magnitude of the DC input power, and $V_{AC}$ is an instantaneous voltage magnitude of the DC output power.

Clause 19: The method of clause 18, wherein the inverter circuit comprises switches arranged in a highly efficient and reliable inverter concept (HERIC) topology, the method further comprising determining a time to turn OFF ($T_{off}$) the first switch of the at least four switches, wherein the controller is configured to determine $T_{off}$ according to:

$$T_{off} = L\frac{I_2 - I_1}{|V_{AC}|};$$

and determining an instantaneous switching frequency according to:

$$f_{SW} = \frac{1}{T_{on} + T_{off}}.$$

Clause 20: The method of any of clauses 17 through 19, wherein the inverter circuit is configured to receive the DC input power from photovoltaic cells and to output the AC power to a power grid.

Various examples of the disclosure have been described. These and other examples are within the scope of the following claims.

What is claimed is:

1. An inverter circuit comprising input terminals, output terminals, and at least four semiconductor switches, the inverter circuit configured to:
   receive direct current (DC) input power at the input terminals and output alternating current (AC) power at the output terminals; and
   receive control signals from a controller, the controller comprising processing circuitry, wherein the control signals modulate a switching frequency for the inverter circuit based at least on an instantaneous AC output current and instantaneous AC output voltage at the output terminals, wherein the switching frequency is further based on a predetermined first AC output current, wherein for at least one operating mode the predetermined first AC output current is such that each switch is configured to turn ON with zero voltage switching (ZVS).

2. The circuit of claim 1,
   wherein the switching frequency varies throughout an AC switching cycle for the inverter circuit,
   wherein the switching frequency is further based on a second AC output current during an AC switching cycle,
   wherein the second AC output current is an electric current value at which each switch turns OFF, and
   wherein the second AC output current has a greater magnitude than the first AC output current.

3. The circuit of claim 1, wherein the output terminals comprise a first output terminal and a second output terminal, and wherein the controller is configured to determine a time to turn ON a first switch of the at least four switches ($T_{on}$), wherein the controller is configured to determine $T_{on}$ according to:

$$T_{on} = L\frac{|I_2 - I_1|}{V_N - |V_{AC}|}$$

wherein:
   L represents a sum of a first inductance connected to the first output terminal and a second inductance connected to the second output terminal,
   $I_1$ represents an instantaneous magnitude of the first AC output current,
   $I_2$ represents an instantaneous magnitude of a second AC output current,
   $V_{IN}$ represents a voltage magnitude of the DC input power, and
   $V_{AC}$ represents an instantaneous voltage magnitude of a DC output power.

4. The circuit of claim 3,
   wherein the inverter circuit comprises switches arranged in a highly efficient and reliable inverter concept (HERIC) topology, and
   wherein the controller is configured to determine a time ($T_{off}$) to turn OFF a first switch of the at least four switches, wherein the controller is configured to determine $T_{off}$ according to:

$$T_{off} = L\frac{|I_2 - I_1|}{|V_{AC}|}.$$

5. The circuit of claim 4, wherein an instantaneous switching frequency ($f_{SW}$) is defined according to:

$$f_{SW} = \frac{1}{T_{on} + T_{off}}.$$

6. The circuit of claim 1, wherein during an AC-cycle of the output AC power, the controller is configured to modulate the switching frequency to enable conduction of an electrical current excursion of the output AC power between the first AC output current and a second AC output current.

7. The circuit of claim 6, wherein the controller is configured to apply a triangular carrier signal to modulate changes in the switching frequency.

8. The circuit of claim 1, wherein the controller is configured to modulate the switching frequency and without regard to zero crossing detection (ZCD) measurements.

9. A system comprising:
   processing circuitry configured to output switching control signals; and an inverter circuit comprising input terminals, output terminals, and at least four switches, the inverter circuit configured to:
  receive direct current (DC) input power at the input terminals and output alternating current (AC) power at the output terminals; and
  receive control signals from the processing circuitry, wherein the control signals modulate a switching frequency for the inverter circuit based at least on an instantaneous AC output current and instantaneous AC output voltage at the output terminals, wherein the switching frequency is further based on a predetermined first AC output current, wherein for at least one operating mode the predetermined first AC output current is such that each switch is configured to turn ON with zero voltage switching (ZVS).

10. The system of claim 9,
wherein the switching frequency varies throughout an AC switching cycle for the inverter circuit,
wherein the switching frequency is further based on a second AC output current during an AC switching cycle,
wherein the second AC output current is an electric current value at which each switch turns OFF, and
wherein the second AC output current has a greater magnitude than the first AC output current.

11. The system of claim 9, wherein the processing circuitry is configured to determine a time to turn ON a first switch of the at least four switches ($T_{on}$), wherein the controller is configured to determine $T_{on}$ according to:

$$T_{on} = L \frac{I_2 - I_1}{V_{IN} - |V_{AC}|}$$

wherein:
  L is a sum of an inductance of a first inductor connected to a first output terminal of the output terminals and of a second inductor connected to a second output terminal of the output terminals,
  $I_1$ is an instantaneous magnitude of the first AC output current,
  $I_2$ is an instantaneous magnitude of a second AC output current,
  $V_{IN}$ is a voltage magnitude of the DC input power, and
  $V_{AC}$ is an instantaneous voltage magnitude of a DC output power.

12. The system of claim 9,
wherein the inverter circuit comprises switches arranged in a highly efficient and reliable inverter concept (HERIC) topology, and
wherein the processing circuitry is configured to determine a time to turn OFF a first switch of the at least four switches ($T_{off}$), wherein the controller is configured to determine $T_{off}$ according to:

$$T_{off} = L \frac{I_2 - I_1}{|V_{AC}|}.$$

13. The system of claim 12, wherein an instantaneous switching frequency $f_{SW}$ is determined by:

$$f_{SW} = \frac{1}{T_{on} + T_{off}}.$$

14. The system of claim 9, wherein during an AC-cycle of the output AC power, the processing circuitry is configured to modulate the switching frequency to enable conduction of an electrical current excursion of the output AC power between the first AC output current and a second AC output current.

15. The system of claim 14, wherein the processing circuitry is configured to apply a triangular carrier signal to modulate changes in the switching frequency.

16. The system of claim 9, wherein the processing circuitry is configured to modulate the switching frequency without regard to zero crossing detection (ZCD) measurements.

17. A method of controlling an inverter circuit, the method comprising:
  receiving, by processing circuitry, an indication of a magnitude of direct current (DC) input power received at input terminals of the inverter circuit;
  receiving, by the processing circuitry, an indication of an instantaneous magnitude of alternating current (AC) power at output terminals of the inverter circuit;
  delivering, by the processing circuitry, control signals to each switch of the inverter circuit, wherein the inverter circuit comprises at least four switches; and
  modulating, by the processing circuitry, and via the control signals, a switching frequency of the inverter circuit, wherein the switching frequency is based at least on an instantaneous AC output current and instantaneous AC output voltage at the output terminals, and is such that for at least one operating mode, each switch is configured to turn ON with zero voltage switching (ZVS).

18. The method of claim 17, further comprising, determining a time to turn ON a first switch of the at least four switches ($T_{on}$), wherein the controller is configured to determine $T_{on}$ according to:

$$T_{on} = L \frac{I_2 - I_1}{V_{IN} - |V_{AC}|}$$

wherein:
  L is a sum of the inductance of a first inductor connected to a first output terminal of the output terminals and of a second inductor connected to a second output terminal of the output terminals,
  $I_1$ is an instantaneous magnitude of the first AC output current,
  $I_2$ is an instantaneous magnitude of a second AC output current,
  $V_{IN}$ is a voltage magnitude of the DC input power, and
  $V_{AC}$ is an instantaneous voltage magnitude of a DC output power.

19. The method of claim 18, wherein the inverter circuit comprises switches arranged in a highly efficient and reliable inverter concept (HERIC) topology, the method further comprising:
  determining a time to turn OFF ($T_{off}$) the first switch of the at least four switches, wherein the controller is configured to determine $T_{off}$ according to:

$$T_{off} = L \frac{I_2 - I_1}{|V_{AC}|};$$

and determining an instantaneous switching frequency according to:

$$f_{SW} = \frac{1}{T_{on} + T_{off}}.$$

20. The method of claim 17, wherein the inverter circuit is configured to receive the DC input power from photovoltaic cells and to output the AC power to a power grid.

* * * * *